Patented Nov. 24, 1925.

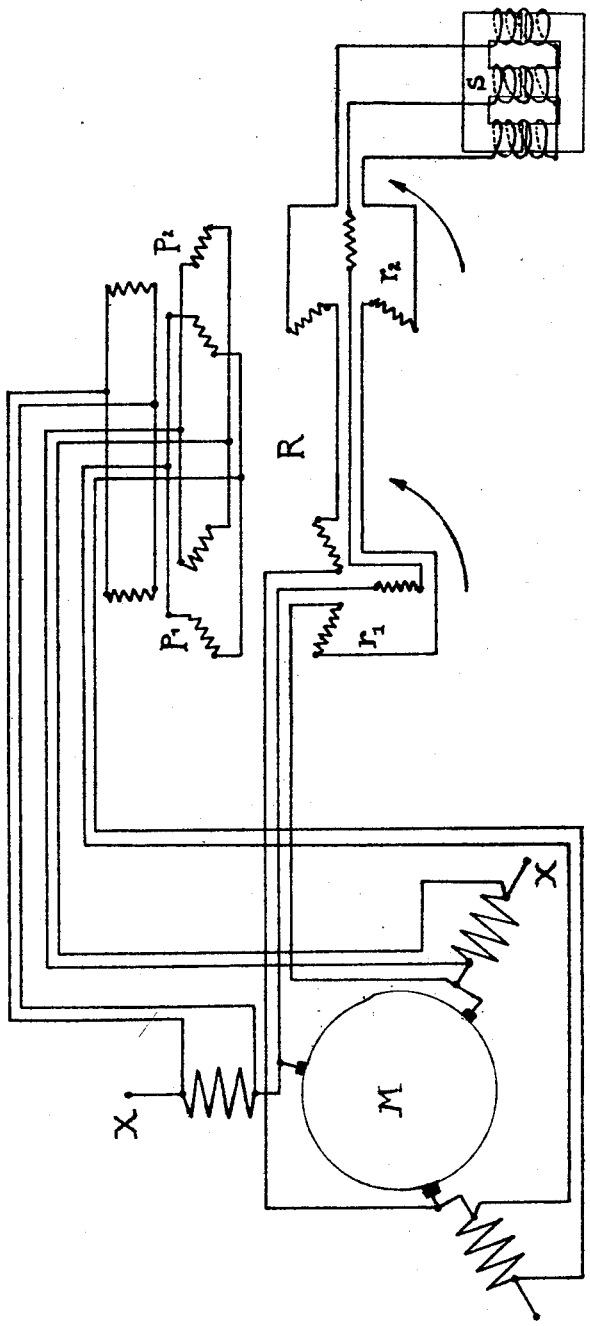

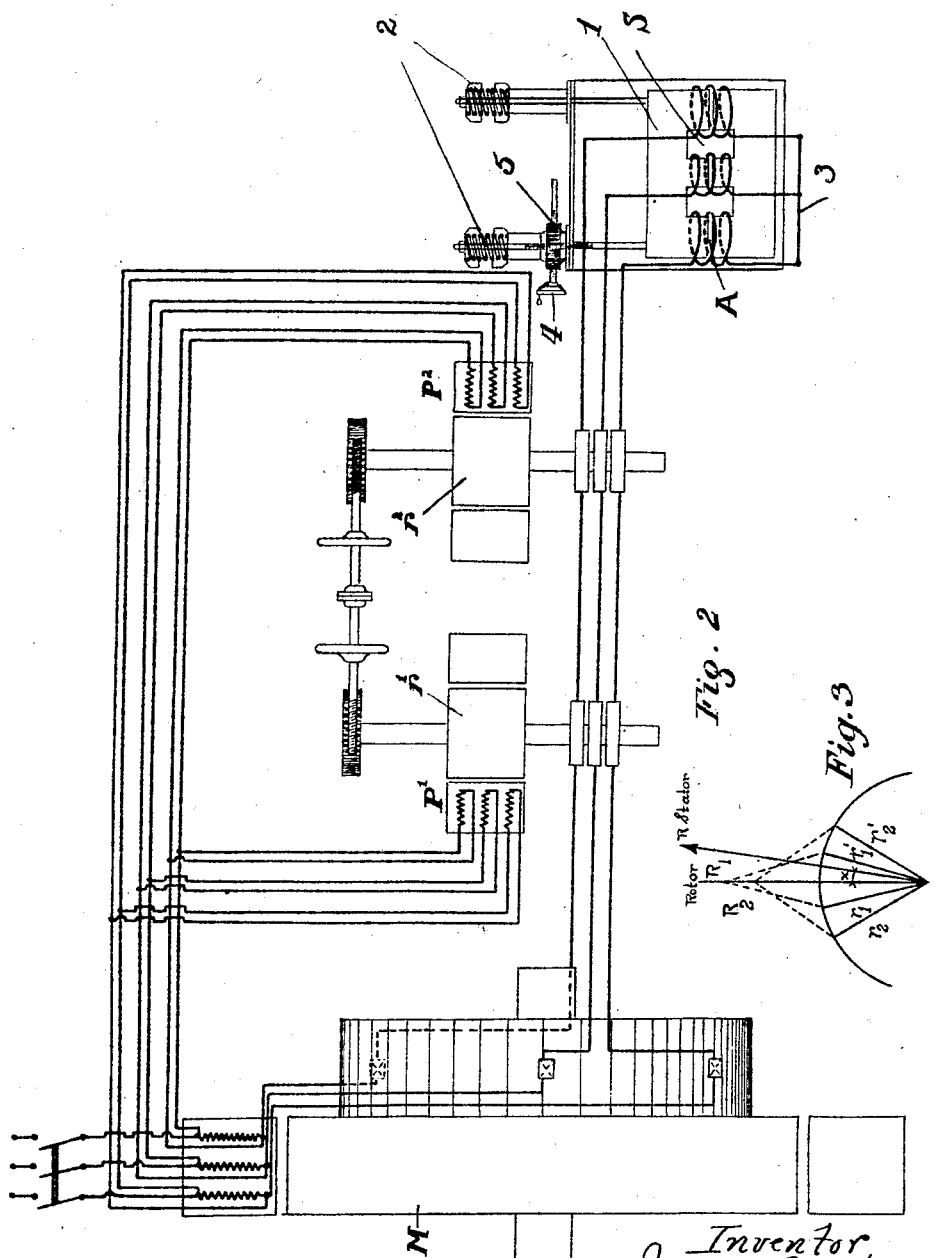

1,562,786

UNITED STATES PATENT OFFICE.

JOSEPH PERRET, OF PARIS, FRANCE, ASSIGNOR TO FORGES & ATELIERS DE CONSTRUCTIONS ELECTRIQUES DE JEUMONT, OF PARIS, FRANCE.

REGULATION OF POLYPHASE COMMUTATING MOTORS.

Application filed March 20, 1922. Serial No. 545,267.

*To all whom it may concern:*

Be it known that I, JOSEPH PERRET, a citizen of the Republic of France, residing at Paris, in the Republic of France, have invented certain new and useful Improvements in the Regulation of Polyphase Commutating Motors, of which the following is a specification.

Polyphase commutator motors are not adapted in their simple form for the operation of rolling mills because this application requires a relatively slight slip (10–15%) and one which is practically constant at all speeds.

In order to obtain this result with a view to the said application, it has already been suggested to connect in shunt across the rotor of the series motor a circuit comprising an inductance and a voltage of suitable value and phase with a view to ensuring the excitation of the machine by its rotor equally well when running under load or running light; but in the ordinary form the regulation of the voltage and the inductance present difficulties.

The system which forms the object of this invention comprises arrangements which carry out these conditions in practice by a simplified operation which may also be combined with automatic arrangements enabling any running characteristic to be obtained whilst preventing wrong operation.

According to this invention the voltage of the shunt circuit is obtained from a double induction regulator in which the primary coils are fed by the stator of the commutator motor instead of being fed directly from the net-work.

The inductance may be regulated by hand or by means of automatic devices with a view to obtaining any characteristic or for preventing wrong operations.

The brush position of the motor may remain fixed so that the automatic or hand regulation may be applied solely to that of the regulator and the inductance.

The invention is more particularly described with reference to the accompanying drawing in which Fig. 1 shows diagrammatically the arrangement according to this invention.

Fig. 2 shows a method of carrying out the same.

Fig. 3 is a diagram showing the relations of the E. M. F.'s of the regulator.

M is a three phase series commutator motor fed from the terminals X; R is a double induction regulator the primary windings of which (stators) $p_1$, $p_2$, mounted in parallel are fed by the stator of the motor M; the secondary windings (rotors) $r_1$, $r_2$ of this regulator R and the adjustable inductance S are mounted in series and this circuit is connected in shunt across the rotor of the motor M.

The regulation of the induction regulator R is obtained by the simultaneous (angular) displacement in the same direction, of its two rotors.

The regulator R is made up of two polyphase regulators in the stators of which the fields rotate in opposite directions so that the phase of the secondary E. M. F. remains constant whilst its amplitude changes with the simultaneous angular displacement of the two rotors. The mechanical connection of the two rotors is arranged in such a way that the relative phase displacement $\alpha$ (Fig. 3) of the secondary electro-motive force and the primary electro-motive force is equal to the angle of adjustment of the brushes. It is well known that in a double regulator the resultant voltage of the rotors can be regulated in order to give any predetermined angle relatively to the common voltage of the stators by suitable displacement of one rotor relatively to the other. This displacement being effected once and for all the simultaneous adjustment to the two rotors will modify the value and not the phase of the resultant voltage.

In Fig. 3 $r_1$ and $r^1_1$ $r_2$ and $r^1_2$ are the E. M. F.'s induced in the rotors corresponding to two different positions; $R_1$ and $R_2$ are the resultant E. M. F.'s in the two cases, the two elements of the regulator being considered identical. The same result will be obtained if the stator fields rotate in the same direction while the rotors are turned in the opposite direction.

As these stators $p_1$ and $p_2$ are connected in parallel with the stator of the motor M the result is that for a constant position of the brushes of the latter, the potential of the rotor of the said motor M and that of the primaries $p_1$, $p_2$, of the regulator R are constantly mutually displaced by a constant angle whatever may be the speed of the motor and the controlling position of the regulator.

It is therefore sufficient to regulate the brush position of the motor and the relative position of the rotors and stators of the regulator to obtain any suitable phase displacement of the voltages, and this displacement will be maintained whatever the speed and whatever the magnitude of the voltages.

For example the terminal voltages of the regulator R and motor M may be maintained in phase. In this case as the reactance of the shunt circuit is generally much more important than its resistance, the current of this circuit will be constantly out of phase with the electromotive force of the rotor of the motor M by 90° that is to say that it will be constantly magnetizing. In particular when running light the magnetizing current will be entirely furnished by the rotor of the motor M and the power factor may be equal to unity.

For each load there corresponds an adjustment of the regulator wherein its E. M. F. is equal to that of the commutator motor so that when under load at a given speed the commutator voltage will be equal and directly opposed to that of the regulator R whereby the current of the shunt circuit is neutralized and the motor works at one of its speeds as a series motor. Its power factor is thus that of the series motor having the same speed and brush position.

Thus the full load speed may be regulated to any suitable value by the regulator R, and the power factor is automatically maintained in proximity to unity equally well whether the machine is under load or running light.

In the above it is assumed that the resistance of the shunt circuit relatively to its reactance is negligible. When this resistance is relatively large it might be compensated by employing a double regulator, the two rotors $r_1$, $r_2$, of which are arranged with having a slightly different number of turns.

The difference in speed between running under series load and running light is practically constant because it depends substantially on the inductance of the shunt circuit.

The relation between the speed and the inductance of the shunt circuit may be obtained as follows: If $I_s$ is current in the stator.

$I_d$ is current in the shunt circuit at the terminals of the rotor.

$E_s$ is E. M. F. at the terminals of the stator.

$E_r$ is E. M. F. at the termials of the rotor.

$E_d$ is E. M. F. at the terminals of the secondary of the double regulator.

$L_r$ is inductance of the rotor.

$L_d$ is inductance of the shunt circuit.

$g_v$ is the slip at no load as a percentage of the synchronous speed.

$g_s$ is the slip under load as a percentage of the synchronous speed.

$L_s$ is the inductance of the stator.

When running light the current in the stator is nil so that the E. M. F. at its terminals is equal to $$E_s = -K\omega M I_d$$

$I_d$ being at this moment the strength of the current circulating in the circuit formed by the rotor, double regulator and the adjustable inductance, M the co-efficient of mutual inductance between the stator and the rotor and K a co-efficient which is a function of the angle of adjustment of the brushes $$E_r = -g_v \omega L_r I_d$$

whence $$\frac{E_r}{E_s} = \frac{g_v L_r}{KM}$$

but $E_r$ is also equal to $\omega L_d I_d + E_d$ so that $$\omega L_d I_d + E_d = E_s \frac{g_v L_r}{KM}$$

$$g_v = \frac{E_d}{E_s} \frac{KM}{L_r} + \omega L_d I_d \frac{KM}{E_s L_r} = \frac{E_d}{E_s} \frac{KM}{L_r} - \frac{L_d}{L_r}$$

When running under load there is a moment when the E. M. F. at the terminals of the rotor is equal to the E. M. F. at the terminals of the double regulator, the latter having been previously adjusted for this object and at this instant a current in the shunt circuit is neutralized and the motor operates as a simple series motor with a slip $g_s$ $$\frac{E_s}{E_d} = \frac{L_s + KM}{\left(L_r + \frac{M}{K}\right) g_s}$$

$$g_s = \frac{L_s + MK}{L_r + \frac{M}{K}} \frac{E_d}{E_s}$$

Therefore the difference of the slip when running light and under load is given by $$g_v - g_s = \frac{E_d}{E_s} \frac{M^2 - L_r L_s}{L_r \left(L_r + \frac{M}{K}\right)} - \frac{L_d}{L_r}$$

neglecting losses $M^2 = L_r L_s$
and this expression is reduced to:

$$g_v - g_s = -\frac{L_d}{L_r}$$

This slip may therefore be regulated to any value by hand regulation from the shunt inductance S, utilizing any one of the ordinary methods, in particular, by variation of its air gap. On the other hand an automatic regulation of this inductance S may also be effected either in order to limit to a given value the power absorbed or to limit the current in its own circuit or for any other purpose and for these different cases mechanisms such as servo-motors and the like may be employed.

In particular as it is preferable that the starting should be effected as a series motor it will thus be necessary that the inductance S should take automatically, during this operation, a high value so as to limit its own current.

This result may be obtained for example as shown in Fig. 2 by the use of an inductance having a variable air gap $a$, the movable part 1 is mounted to move against springs 2. If the value of the current in the windings 3 of the inductance S increases beyond a certain value, the air gaps $a$ diminish compressing the springs 2 and thus this automatic variation of the inductance will limit its current.

The air gap $a$ may be given any desired adjustment by means of a hand wheel 4 moving the movable part 1 of the core through worm or the like gearing 5.

This automatic arrangement has the advantage of avoiding breaking the feed circuit by the circuit breaker in the case of an error in operation.

I declare that what I claim is:—

1. A controlling system for polyphase commutator motors comprising in combination a polyphase commutator motor having stator and rotor windings connected in series, an induction regulator having double primary and secondary windings, electrical connecting means between said stator and said primary windings, electrical connecting means between said secondary winding and said rotor winding and means to vary the phase displacement of the voltages of said motor and said regulator.

2. A controlling system for polyphase commutator motors comprising in combination a polyphase commutator motor, having stator and rotor windings connected in series, an induction regulator having double primary and secondary windings, connecting means between said stator and said primary windings, connecting means between said secondary winding and said rotor and an inductance in series with said secondary windings and means to vary the phase displacement of the voltages of said motor and said regulator.

3. A controlling system for polyphase commutator motors comprising a polyphase commutator motor having stator and rotor windings, a double induction regulator, primary windings in said regulator shunted across said stator, secondary windings in said regulator in shunt across said rotor and a variable inductance in series with said secondary windings.

4. A controlling system for polyphase commutator motors comprising a polyphase commutator motor having stator and rotor windings, a double induction regulator, primary windings in said regulator shunted across said stator, secondary windings in said regulator in shunt across said rotor, a variable inductance in series with said secondary windings and means for automatic adjustment of said inductance according to the current flowing there-through.

In witness whereof, I have hereunto signed my name this 28 day of February 1922.

JOSEPH PERRET.